United States Patent [19]

Schulz

[11] 4,034,631
[45] July 12, 1977

[54] APPARATUS FOR SUPPORTING AND PRECISION TURNING OF LARGE ROTARY MEMBERS

[75] Inventor: Siegfried Schulz, Rolling Meadows, Ill.

[73] Assignee: Continental Field Machining Co., Inc., Schaumburg, Ill.

[21] Appl. No.: 735,742

[22] Filed: Oct. 26, 1976

[51] Int. Cl.² .................... B23B 5/00; B23B 17/00
[52] U.S. Cl. .................................... 82/2 R; 82/4 R; 82/32
[58] Field of Search .............. 82/2 R, 4 R, 32, 1 R; 408/234

[56] References Cited

U.S. PATENT DOCUMENTS

| | | | |
|---|---|---|---|
| 2,010,557 | 8/1935 | Nenninger et al. | 82/32 X |
| 2,546,687 | 3/1951 | Brandenburg | 82/32 X |
| 3,165,865 | 1/1965 | Bosquet et al. | 82/4 R X |
| 3,392,610 | 7/1968 | Molinaro | 82/4 R X |
| 3,749,509 | 7/1973 | Lukoshnikov | 82/32 X |

*Primary Examiner*—Leonidas Vlachos
*Attorney, Agent, or Firm*—Anthony S. Zummer

[57] ABSTRACT

The subject invention relates to a portable, heavy-duty apparatus for machining large rotary devices. The apparatus includes a heavy-duty, portable base for supporting the apparatus on an uneven surface; and a pair of movable pedestals are adjustably mounted on the base to accommodate work pieces of varying sizes and lengths. A cutting element is adjustably mounted on a cutter support for positioning the cutter in a selected position and attitude.

15 Claims, 16 Drawing Figures

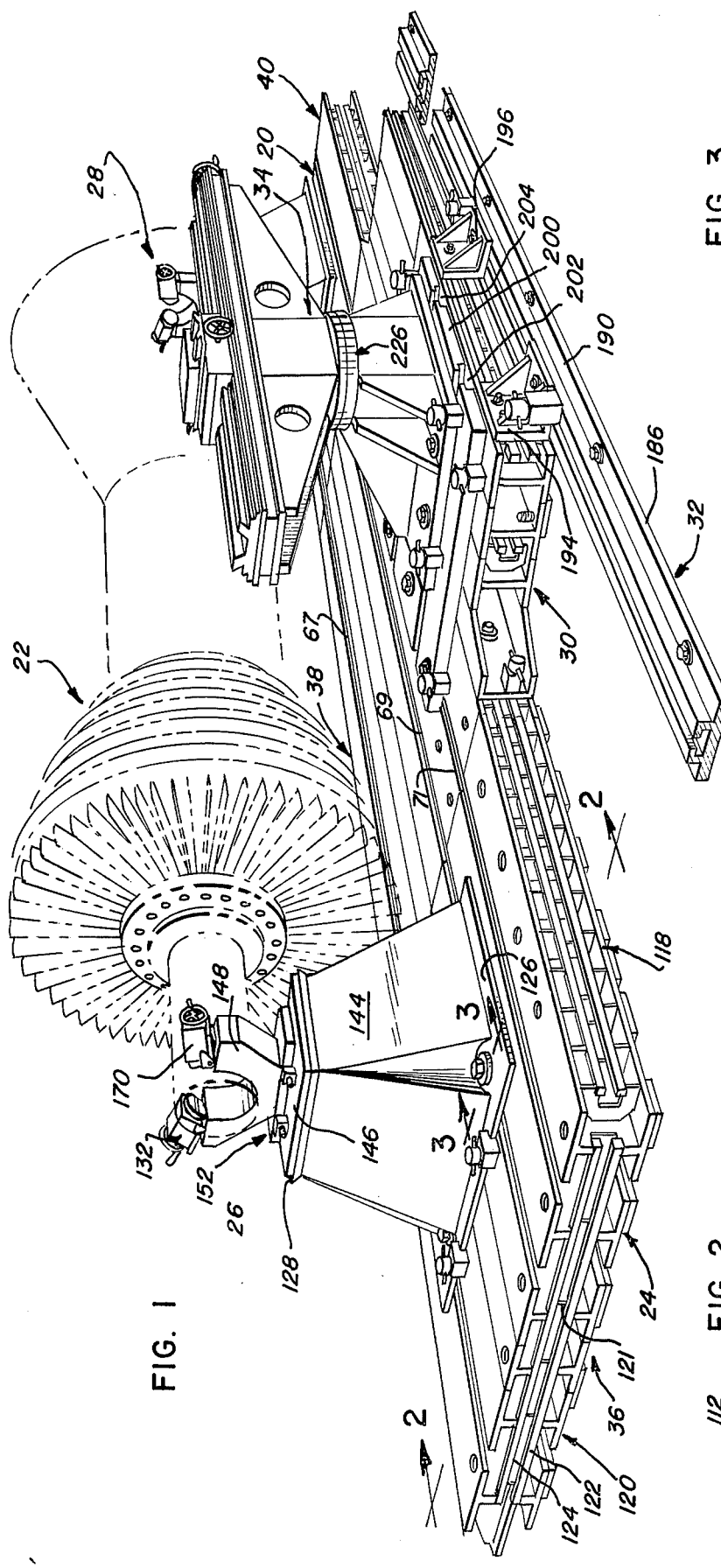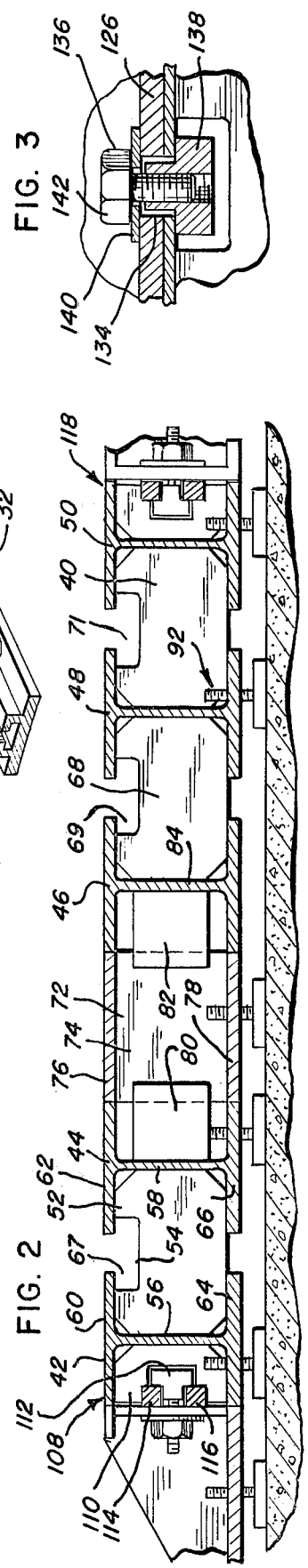

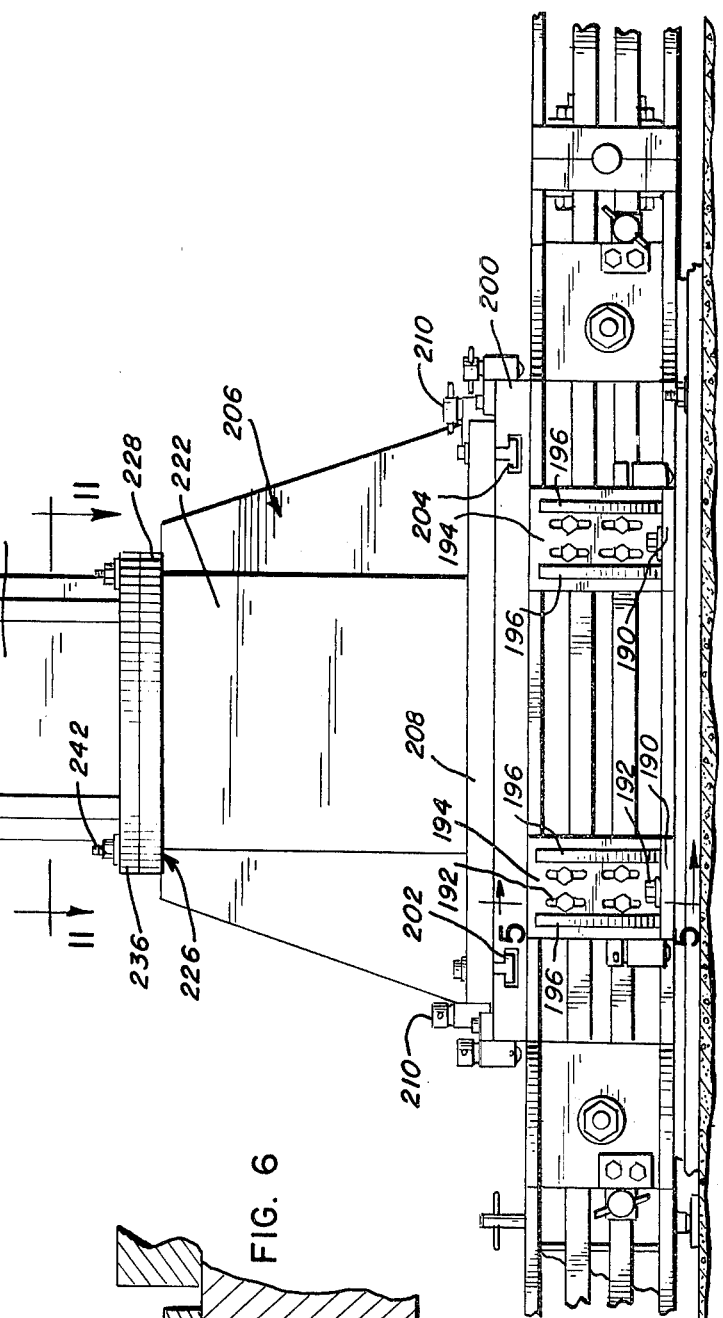

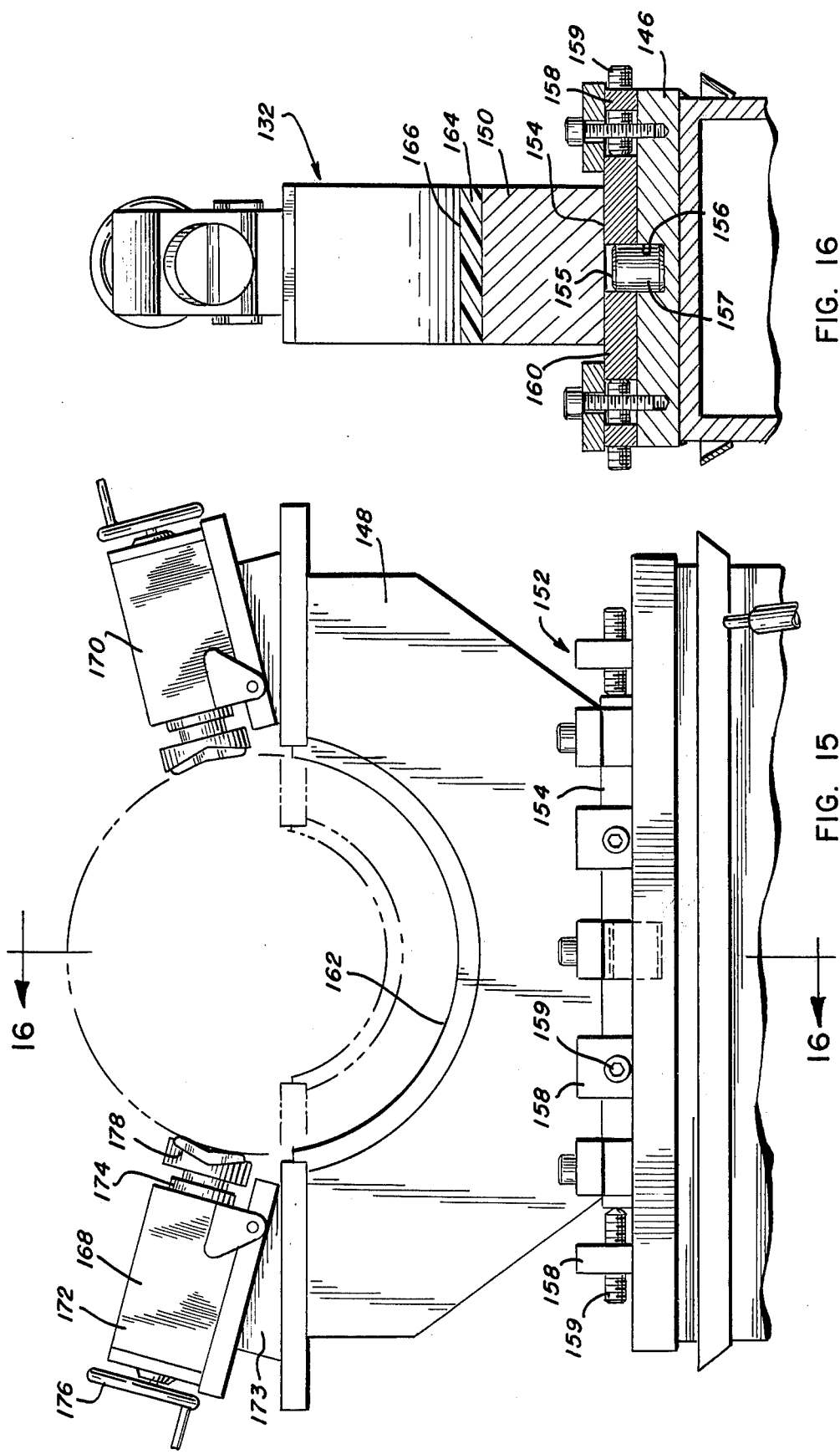

APPARATUS FOR SUPPORTING AND PRECISION TURNING OF LARGE ROTARY MEMBERS

BACKGROUND OF THE INVENTION

Steam turbine generators which are used in modern-day electrical power-generating stations are, in many instances, of a substantial size. Some of the turbines, with the appropriate shaft, weigh as much as 150 tons and are 35 feet long. These steam turbine generators usually operate continuously when in operation. However, parts do wear; and it is necessary to make periodic inspections and repair parts of the turbines.

The mere size of the turbine shafts and blades mounted thereon makes it particularly desirable to do whatever repairs are to be done on the turbine and shaft in the power-generating station, rather than shipping the parts to a maintenance shop some distance from the station.

It may be appreciated that, in order to work on the turbine and shaft, a conventional lathe may not be used with any degree of efficiency since a conventional lathe is too small to accept the shaft. Accordingly, it is necessary to build a turning device which will accept a turbine shaft; and will also be able to turn the parts with a high degree of accuracy.

It is readily apparent that the device must be mounted on a base which is structurally sound, and one which will provide an accurate positioning of various parts and still maintain the parts in a selected relationship.

SUMMARY OF THE INVENTION

The present invention relates to an apparatus for turning a large, heavy-weight device, which apparatus is portable and may be easily set up in a variety of places. The apparatus generally consists of a base, which is made up of a plurality of sections. Each section is made up of I-beams, which I-beams are secured to each other to form a plurality of tracks or slots. The bottom of the base has a plurality of feet connected thereto for leveling the base. The tracks receive pedestals, which may be moved along the tracks, which pedestals are appropriately positioned to receive a turbine shaft. A cutter support base is releasably secured to the base, and is positioned between the base and a guide rail. A cutter support is mounted on the cutter support base. The cutter support includes a cutter bed, which has a cutter tower mounted thereon. The cutter tower is movably mounted on the bed. A portion of the cutter tower is rotatable in order to rotate the cutter. The cutter is mounted on a plurality of adjustment devices, so that the cutter may be moved laterally and perpendicularly to the work piece.

BRIEF DESCRIPTION OF THE DRAWINGS

FIG. 1 is a perspective view of a portable machining apparatus embodying the present invention, with a conventional turbine shaft shown mounted therein, the turbine shaft being shown in dotted form;

FIG. 2 is a cross-sectional view taken on Line 2—2 of FIG. 1, showing a portion of a base which constitutes a portion of the apparatus of FIG. 1, showing the base mounted on a floor;

FIG. 3 is a cross-sectional view taken on Line 3—3 of FIG. 1, showing a portion of a shaft support pedestal locked in a T-slot in the base;

FIG. 4 is an end elevational view of a cutter support and its base, with the upper portion of the cutter support rotated 90° to show better the interrelationship of the parts;

FIG. 5 is an enlarged cross-sectional view, taken on Line 5—5 of FIG. 4, showing a portion of a guide rail of FIG. 4;

FIG. 6 is an enlarged cross-sectional view of a jack for raising a cutter tower on its bed to move the cutter tower relative to the bed;

FIG. 7 is a cross-sectional view taken on Line 7—7 of FIG. 6;

FIG. 15 is an enlarged side elevational view of a shaft yoke, shown in FIG. 1; and FIG. 16 is a cross-sectional view taken on Line 16—16 of FIG. 15.

DESCRIPTION OF THE PREFERRED EMBODIMENT

Figures 8, 9, 10:
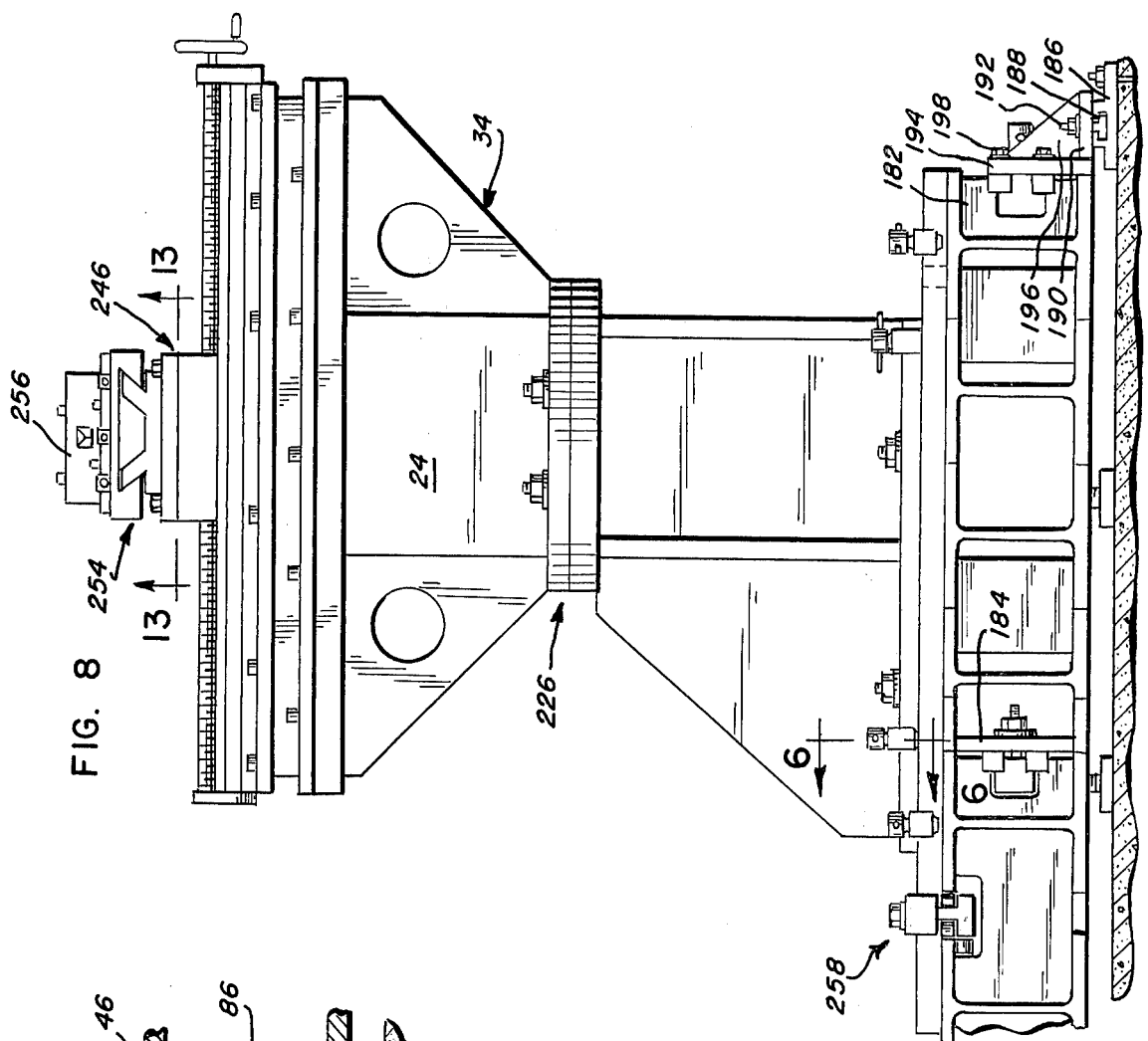
FIG. 8 is a side elevational view of the cutter support shown in FIGS. 1 and 4, in the attitude of FIG. 4.
FIG. 9 is an enlarged cross-sectional view, showing a support foot and a tool for adjusting the support foot.
FIG. 10 is an enlarged fragmentary cross-sectional view of a portion of the cutter support bed, showing the connection of the bed to the base.
Figure 11:
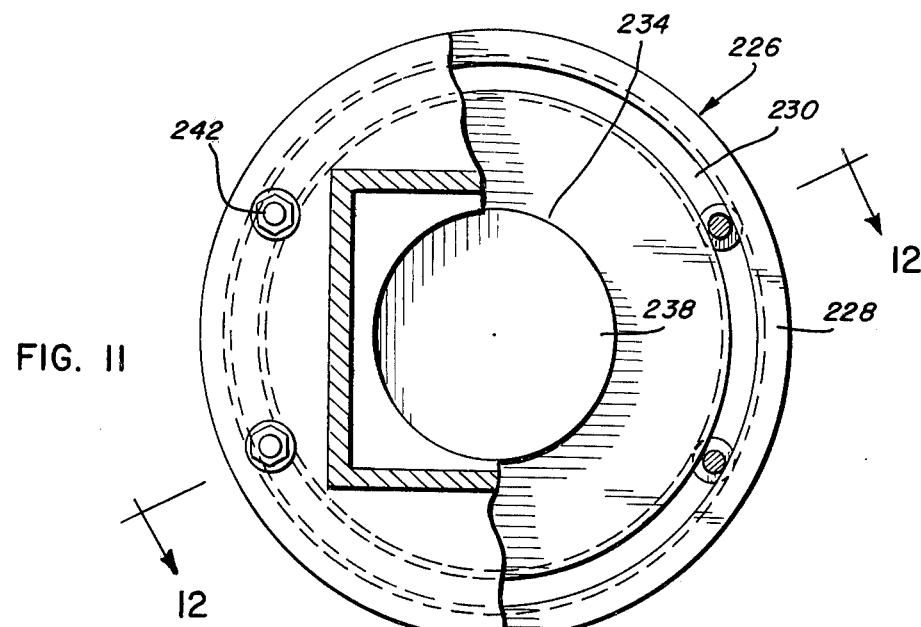
FIG. 11 is an enlarged cross-sectional view taken on Line 11—11 of FIG. 4.
Figure 12:
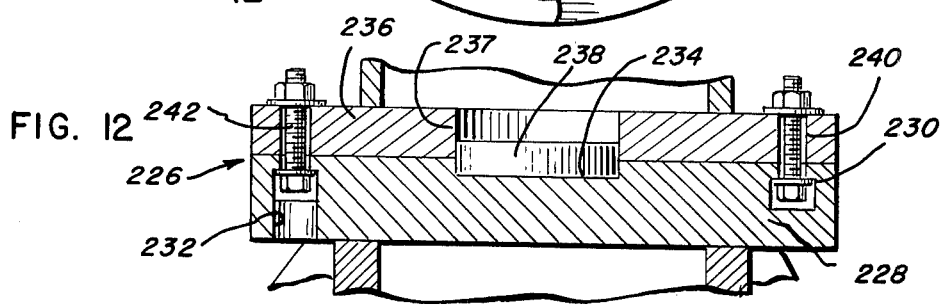
FIG. 12 is a cross-sectional view taken on Line 12—12 of FIG. 11.
Figure 13:
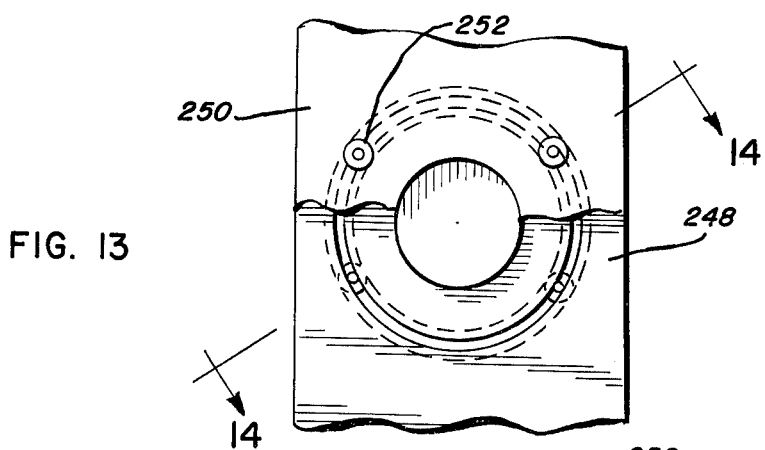
FIG. 13 is a cross-sectional view taken on Line 13—13 of FIG. 8.

Referring now to the drawings, and especially to FIG. 1, an apparatus generally indicated by numeral 20 is shown therein, which apparatus 2 is a specific embodiment of the present invention. In FIG. 1, there is shown in dotted form a conventional turbine rotor and shaft, generally indicated by numeral 22, mounted in the apparatus 20. The apparatus 20 generally consists of a main base 24, with a pair of support pedestals 26 and 28 movably mounted thereon. A cutter support base 30 is secured to the main base 24. A guide rail 32 is fixed to a floor, and is releasably secured to the cutter base 30. A cutter support 34 is mounted on the cutter base 30.

The base 24 is made up of three portable sections 36, 38 and 40. The construction of these portable sections is identical; and the size of the sections is such that each section may be loaded onto a truck for transporting the section from locale to locale. Section 36 is described in detail herein. It is to be understood that the construction of the remainder of the sections is substantially identical to section 36.

Referring to FIG. 2, it may be seen that section 36 is made up of a pair of identical I-beams 42 and 44 on one side of the section and three I-beams 46, 48 and 50, identical to I-beams 42 and 44, on the other side of the section. The I-beams 42 and 44 are connected to each other by a plurality of beam connector plates 52. Each of the beam connector plates is generally rectangular in shape, with the four corners beveled. A recess 54 is formed in the upper edge of the connector plate. Each plate 52 is welded at one end to web 56 of beam 42, and at the other end to web 58 of beam 44. The upper edge of each plate 52 is welded to an upper flange 60 of beam 42 and to upper flange 62 of beam 44. The lower edge of each plate 52 is welded to a lower flange 64 of beam 42 and to lower flange 66 of beam 44. Inasmuch as the beams are held together by plates 52 and plates 52 are of the identical size, beams 42 and 44 are parallel to each other, and the upper flanges 60 and 62 are spaced a uniform distance from each other. The flanges 60 and 62, in cooperation with the recess 54 of plate 52, define a T-slot 67 along the length of the section 36. Beam 46 is secured to beam 48 by a plurality of plates 68, which are identical to the plate 52 described above. A T-slot 69 is defined between I-beams 46 and 48. Beam 48 is secured to beam 50 by a plurality of plates 70, which are identical to the plates 52. A third T-slot 71 is defined between I-beams 48 and 50.

Beam 44 is secured to beam 46 by a plurality of spacers. Each of the spacers is a stub I-beam 72 having the same cross-section as the I-beams 42, 44, 46, 48 and 50. Each stub I-beam has a web 74, an upper flange 76, and a lower flange 78. Each stub I-beam has a connector plate 80 welded to the web 74 on one edge, and the opposite end of the connector plate is welded to web 58 of I-beam 44. At the other end of the stub I-beam 72, there is a connector plate 82, which is welded to the web 74 on one edge, and the opposite edge of plate 82 is welded to a web 84 of I-beam 46. The upper flanges of I-beams 42, 44, 46, 48 and 50, with the stub I-beams, define an upper surface which is in substantially one plane.

A plurality of adjustable levelers 92 is mounted on the lower flange of the I-beams to provide a convenient means for leveling the section when the section is placed on a surface which is either not even or not flat. The construction of the levelers may be best seen in FIG. 9. Each leveler includes a threaded column 94, which is threadedly mounted in a threaded aperture in a lower web. In FIG. 9, the leveler is mounted in lower flange 78. A foot 96 is mounted on the bottom of column 94 to provide an enlarged surface for distributing the weight of the base and material loaded on the base. A tool aperture 98 is formed in upper flange 76 for receipt of a conventional T-wrench 100. The T-wrench includes a shank 102, with a T-handle 104 mounted on one end. A driver 106 is formed on the other end of the shank. The driver 106 mates with a conventional driver aperture in the top of column 94, which is not shown, for rotating the column to raise or to lower foot 96 as may be required.

A side guide is formed on the opposed sides of the section. A side guide 108 is mounted on the outer side of beam 42. Side guide 108 includes a plurality of flat guide plates 110. Each guide plate 110 is welded between the upper and lower flanges 60 and 64 of I-beam 42 and is also welded to the web 56. Each guide plate includes a recess 112 on the outside side of the guide plate. A pair of guide rails 114 and 116 is welded to the guide plates. A side guide 118 is secured to the I-beam 50, as may be seen in FIG. 2. The side guide 118 is identical in construction to the side guide 108.

As may be seen in FIG. 1, section 36 has an end guide 120 formed on the end of the section. End guide 120 is formed by cutting recesses 121 into the ends of the webs of the I-beams and welding a pair of guide bars 122 and 124 to the webs. An end guide is built into the other end of the section, identical to end guide 120. The side guides and the end guide serve as T-slots for the section.

The construction of the section is very sturdy and has accurate surfaces. The parts are all welded together.

Then the adjacent surfaces, which form the T-slots and the guides on the sides and ends, are all ground to a selected finish. Thus, the base is easily manufactured, but is sturdy and precise at its critical parts.

Pedestals 26 and 28 are identical in construction. Pedestal 26, which is described in detail below, generally consists of a pedestal plate 126, releasably secured to the base; a pedestal column 128; and a yoke assembly 132. The pedestal plate 126 is a flat steel plate, which has a plurality of apertures 134 for receipt of pedestal fasteners 136. Each of the pedestal fasteners 136 includes a T-nut 138, which rides in a T-slot, with a washer 140 and a conventional machine screw 142 threadedly mounted in the T-nut 138. The column 128 is made up of a plurality of steel plates 144, which are welded to each other to make up the column, with a plate 146 welded at the top.

Yoke assembly 132 is mounted on the top plate 146. The yoke assembly includes a crescent body 148. A locking assembly 152 is fixed to the top plate 146. The locking assembly 152 includes a pivot plate 154, fixed to body 148; and the pivot plate has a pivot aperture 155 contained therein. A fixed pivot aperture 156 is formed in top plate 146, with a pivot stud 157 mounted therein and extending into aperture 155. A plurality of anchor plates 158 is secured to the top plate 146, with threaded studs 159 mounted in the plates 158. The studs engage pivot plate 154 for positioning the pivot plate relative to the top plate. The body 148 has an opening 162 in its center, which opening is a portion of a circle. The opening has a finished insert 164 fixed therein, with a thin plastic liner 166 mounted on the finished surface.

A pair of identical holding units 168 and 170 is mounted on opposite ends of the body. Holding unit 168 is conventional in its construction in that it includes a holder body 172, attached to a mount 173. A threaded shaft 174 is movably mounted in the body. A wheel 176 drives the shaft, which moves a head 178 radially relative to the center of the circle defining recess 164.

The cutter support base 30 is made up of a plurality of I-beams 180 welded to each other. The I-beams are of the same size as the I-beams 42, 44, 46, 48 and 50, mentioned above. The I-beams 180 also have levelers 92 mounted on the lower side. The support base also has a side guide 182 formed therein, which is identical in construction to the side guide 108 on one side, and has a web 184 on the other side for attachment to the side guide 118 of base 24.

The guide rail 32 includes a base 186, having a T-slot 188 contained therein. A pair of spaced guide plates 190 is secured to the base 186 by a plurality of T-fasteners 192. A side plate 194 is welded to each plate 190, and is reinforced by a pair of reinforcement gussetts 196. The side guide 182 is secured to the plate 194 by a plurality of fasteners 198.

The cutter support 34 includes a cutter support bed 200, which has a pair of parallel T-slots 202 and 204 contained therein. The bed 200 is mounted on cutter support base 30. A cutter support tower assembly 206 is mounted on the bed 200. Tower assembly 206 may be selectively moved in the T-slots 202 and 204. Tower assembly 206 includes a bottom plate 208, which has mounted thereon a plurality of jacks 210. The construction of the jacks may be best seen in FIGS. 6 and 7. Each of the jacks 210 includes a jack body 212, which is secured to plate 208. A wheel yoke 214 is slideably mounted inside the body, with a wheel 216 rotatably mounted in the yoke. A threaded shaft 218 engages the yoke; and rotation of the shaft 218 through a handle 220 raises and lowers the wheel 216 as is desired.

The tower assembly includes a lower column 222 and an upper column 224. The columns 222 and 224 are joined by a rotatable connection 226. The connector 226 includes a lower plate 228, which has a circular T-groove 230 formed therein. A screw aperture 232 communicates with the T-groove 230. The plate 228 also includes a circular pivot recess 234. An upper plate 236 slides on the upper surface of plate 228. The upper plate has an opening 237, which is in registry with the recess 234. A cylindrical pivot block 238 is mounted in recess 234 and in aperture 237. The block 238 provides a pivot point for rotating the upper plate relative to the lower plate. The upper plate contains four bolt holes 240 for receiving conventional bolts 242. The bolts are positioned in the T-slot 230 by inserting the bolts through the bolt aperture 232. The bolts are moved along the T-slot until they are aligned with their respective bolt apertures 240. Plate 236 is brought down over the bolts. Thus, the two plates may be locked to each other very simply by tightening the bolts 242. However, the plates may be moved relative to each other simply by loosening the bolts and rotating the plates.

Figure 14:
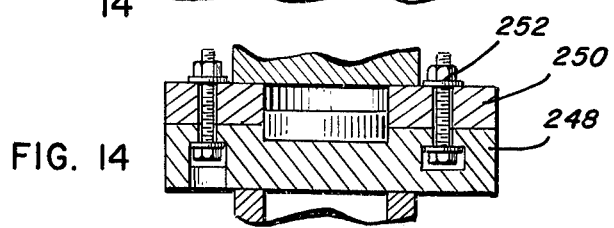
FIG. 14 is a cross-sectional view taken on Line 14—14 of FIG. 3.

The column 224 has a conventional adjustable sliding way 244 mounted thereon. A second rotatable connector 246 is mounted on top of the conventional way 244. Connector 246, as may be seen in FIG. 14, includes a lower plate 248 and an upper plate 250, with a plurality of conventional bolts 252 mounted therein. The construction of connector 246 is identical to that described in connection with connector 224. A smaller conventional machine way 254 is mounted on top of the plate 250, and has a conventional tool holder 256 mounted thereon.

The bed 200 includes a locking assembly 258, which holds the bed in the T-slot 71 of the base. The assembly 158 includes a block 260, with a T-head 262 which has a pair of rollers 265 and 266 rotatably mounted therein for engagement with the upper flanges of beams 48 and 50. A roller 268 is mounted on the head 262 for engagement with the underside of the upper flange of beam 48.

The instant apparatus is readily portable by truck in view of the fact that the device may be disassembled into large but portable sections. As was pointed out above, the base 24 is broken up into three sections. The pedestals 26 and 28 are removed from the base. The cutter support base 30 is disconnected from the base 24; and the cutter support 34 is removed from its support.

The apparatus, in a disassembled attitude, is delivered to a power-generating station, where a turbine rotor and shaft is to be machined. Base 24 is first set up. The sections are placed adjacent to each other; and the sections are connected to each other. The guide rail 32 is installed; and the cutter support base is also installed. It may be appreciated that the levelers place the base and the cutter support base into an attitude of being perfectly level, irrespective of the condition of the floor of the power-generating station and whether there is a slope or not. The guide rail 32 is placed into position and secured down. Once the base is level, the pedestals 26 and 28 are positioned on the base. These pedestals may be moved relative to each other to get the yokes in their proper position. The rotor and shaft are lifted out of the housing by a crane, which is part of the equipment of the power-generating station. Generally, the power-generating stations have cranes available to handle the equipment in the station, so that it is not necessary to import cranes. The rotor is lowered into position adjacent to the yoke assemblies. It may be appreciated that the yokes may be moved on the pedestals to make certain that the yoke is perfectly aligned. The alignment is done very carefully; and the shaft is then settled into the yoke. The holders are then secured to the shaft. When it is determined what work is to be done on the rotor or shaft, the cutter support is appropriately positioned; and the cutter support may be moved along the base. The support columns may be moved transversely of the base by raising the jacks and moving the entire support column.

It may be appreciated that the cutter may be adjusted in any of a variety of manners. There may be rough adjustments made by moving the entire cutter support or the bed of the cutter. However, finer adjustments are made relative to the rotor on the finer portions of the cutter support, as is conventional.

The rotor is rotated by a suitable source of power, which is not shown herein in view of the fact that suitable sources of power for rotating these rotor shafts are well-known in the art and are not germane to the present invention. As the rotor is rotated by a suitable source of power, the cutter makes an appropriate cut on the rotor, as is desired. It may be appreciated that the cutter may be moved along the entire length of the rotor shaft. The base of the cutter support is moved in the side guide, and the cooperation of the side guide and the guide rail 32 appropriately positions the base. The bed of the cutter is connected to the base 24, so that it is always held securely relative to the pedestals and thereby the rotor work piece.

After the necessary work has been done on the rotor, the rotor is simply lifted out of the pedestals and placed back onto its housing. The apparatus may be quickly and conveniently removed from the power-generating station, so that the device does not interfere with the normal operation of the power-generating station.

Although a specific embodiment of the herein-disclosed invention has been described in detail above, it is to be understood that the instant invention is limited only by the appended claims.

What is claimed is:

1. In an apparatus for supporting and turning a large rotatable work piece, said apparatus having a pair of spaced supports for rotatably supporting a large rotatable work piece, a cutter support for holding a cutter in position adjacent to the work piece, the improvement comprising a base for connecting the cutter support to the spaced supports in a selected spaced relationship and holding the spaced supports in a selected spaced relationship, said base including, a pair of I-beams spaced from each other, a plurality of beam connectors securing the I-beams to each other and holding the I-beams parallel to each other to form a gap of a uniform width between selected portions of the beams, a second pair of I-beams spaced from each other, another plurality of beam connectors securing the beams of the second pair to each other and holding the beams parallel to each other to form a gap of uniform width between the beams, a plurality of spacers securing the pairs of I-beams to each other, holding each pair of I-beams parallel to the other pair of I-beams and a selected surface of each of the beams in substantially one plane, and a plurality of levelers mounted on the I-beams for adjusting the selected surface of the I-beams to a substantially flat surface.

2. In an apparatus for supporting and turning a large rotatable work piece as defined in claim 1, including a fifth I-beam parallel to the second pair of I-beams and being spaced from, and adjacent to, one of the I-beams in the second pair, another plurality of beam connectors securing the fifth I-beam to the adjacent I-beam and holding the beams parallel to each other to form a third gap of uniform width between the beams, each of said I-beams having the same cross-section and same length, each of the beam connectors being a plate welded to the beams which the plate connects and being substantially perpendicular to the length of the beams, each of said plates having a recess in its upper portion for being positioned between the respective I-beams to form a T-slot between the I-beams, each of the spacers of the plurality of spacers being a stub I-beam having the same cross-section as the aforementioned I-beams, said stub I-beams being welded on each end to the adjacent I-beams, and a pair of stub I-beam connector plates being welded to a web of each of the stub I-beams, one end of each of the stub I-beam connector plates being welded to the web of the respective stub I-beam and the other end being welded to the adjacent I-beam for holding the stub I-beam substantially perpendicular to the I-beams.

3. In an apparatus for supporting and turning a large rotatable work piece as defined in claim 2, including a side guide on one side of the base, said side guide including a plurality of guide plates welded to one of said I-beams, forming one side of the base, each of said guide plates having a recess formed therein, a pair of spaced guide bars welded to the guide plates to cooperate with the recess in the guide plates to form a T-slot therein.

4. In an apparatus for supporting and turning a large rotatable work piece as defined in claim 2, wherein each of the levelers includes a threaded column threadedly mounted on a lower flange of an I-beam, and a foot mounted on the lower end of each of the threaded columns, a tool aperture formed in an upper flange of the respective beam directly above the threaded column to allow insertion of a tool through the upper flange to engage the threaded column to turn the column and adjust the level of the foot.

5. In an apparatus for supporting and turning a large rotatable work piece as defined in claim 1, wherein said base includes a side guide generally forming a T-slot on one side of the base.

6. In an apparatus for supporting and turning a large rotatable work piece as defined in claim 1, the improvement including a guide rail spaced from the base and being connectable to the cutter support for positioning the cutter support relative to the base.

7. In an apparatus for supporting and turning a large rotatable work piece as defined in claim 1, the improvement including a cutter support base, the cutter support being mounted on the cutter support base and being connected to the base, said cutter support including a tower having a rotatable connector, said rotatable connector allowing 360° rotation of an upper portion of the cutter support relative to a lower portion of the cutter support.

8. In an apparatus for supporting and turning a large rotatable work piece as defined in claim 1, the improvement being wherein each of the spaced supports is slideably mounted on each of the pair of I-beams and connected to the I-beams at the gap between said I-beams, whereby the spaced supports are movable along the I-beams in the gap for adjusting the distance between the supports for receipt of a work piece of a selected length.

9. In an apparatus for supporting and turning a large rotatable work piece as defined in claim 1, the improvement including a cutter support base, the cutter support being mounted on the cutter support base and being connected to the first-mentioned base, each of the spaced supports being slideably mounted on each of the pair of I-beams and connected to the I-beams at the gap between said I-beams, whereby the spaced supports are movable along the I-beams in the gap for adjusting the distance between the supports for receipt of a work piece of a selected length.

10. In an apparatus for supporting and turning a large rotatable work piece as defined in claim 1, the improvement including a cutter support base, the cutter support being mounted on the cutter support base and being connected to the firstmentioned base, each of the spaced supports including a yoke at the upper end thereof, each yoke being pivotal and adjustable on the upper portion of the spaced support for receipt of a shaft portion of the workpiece, each of said yokes including a thin plastic liner for engagement with the shaft of the work piece.

11. In an apparatus for supporting and turning a large rotatable work piece as defined in claim 1, the improvement including a side guide generally forming a T-slot on one side of the base parallel to the I-beams, a cutter support base releasably connected to the base at the side guide T-slot, the cutter support being mounted on the cutter support base and being slideably connected to the first-mentioned base, said cutter support including a tower having a rotatable connector allowing 360° of an upper portion of the cutter support relative to the cutter support base, each of the spaced supports being slideably mounted on each of the pair of I-beams and connected to the I-beams at the gap between the I-beams, and each of the spaced supports including a yoke at the upper end thereof, each yoke being pivotal and adjustable on the spaced support for receipt of a shaft portion of the workpiece.

12. In an apparatus for supporting and turning a large rotatable work piece as defined in claim 1, wherein the base is separable into three sections for transportation of the base.

13. In an apparatus for supporting and turning a large rotatable work piece as defined in claim 1, the improvement being wherein each of the spaces supports includes a yoke at the upper end thereof, each yoke being pivotal and adjustable on the spaced support for receipt of a shaft portion of the work piece, each of said yokes including a thin plastic liner for engagement with a shaft of the work piece.

14. In an apparatus for supporting and turning a large rotatable work piece as defined in claim 1, the improvement including a cutter support base connected to the first-mentioned base, the cutter support being mounted on the cutter support base and being slideably connected to the first-mentioned base, each of the spaced supports being slideably mounted on each of the pair of I-beams and connected to the I-beams at the gap between said I-beams, each of the spaced supports including a yoke at the upper end thereof, each yoke being pivotal and adjustable on the spaced support for receipt of a shaft portion of the work piece, and each of said yokes including a thin plastic liner for engagement with the shaft of the work piece.

15. An apparatus for supporting and turning a large rotatable work piece, comprising, a base having a substantially flat upper surface, said base having three parallel T-slots formed in said upper surface, a plurality of levelers mounted on the lower portion of said base for adjusting the base to position the three T-slots into a substantially single plane, a side guide T-slot formed in the base on one side thereof, said side guide being parallel to the three parallel T-slots, a cutter support base releasably secured to the first-mentioned base at the side guide, a guide rail releasably secured to the cutter support base, a pair of support pedestals mounted on the first-mentioned base and being connected to said base in a pair of adjacent T-slots, said support pedestals being releasably slideably connected to said base, each of said support pedestals having a yoke in its upper portion for receipt of the rotatable work piece, a cutter support mounted on the cutter support base, said cutter support including a bed being connected to the third T-slot of the first-mentioned base, said bed having a pair of cutter T-slots substantially perpendicular to the three parallel T-slots, a support tower slideably mounted on the bed, a plurality of roller jacks connected to the support tower for raising the support tower relative to the bed for moving the tower relative to the bed, said tower having a rotatable connector for rotating an upper portion of the tower 360° relative to a lower portion of the tower, an elongated way connected to the upper portion of the tower, a second rotatable connector mounted on the way, and a cutter holder connected to the rotatable connector for rotating the cutter holder 360° relative to the tower.

* * * * *

UNITED STATES PATENT OFFICE
CERTIFICATE OF CORRECTION

Patent No. 4,034,631           Dated July 12, 1977

Inventor(s) Siegfried Schulz

It is certified that error appears in the above-identified patent and that said Letters Patent are hereby corrected as shown below:

Column 2, Line 37, "2" should be --20--.

Column 5, Line 8, "connection" should be --connector--.

Column 5, Line 42, "158" should be --258--.

Column 8, Line 55, "spaces" should be --spaced--.

Signed and Sealed this

Twenty-seventh Day of September 1977

[SEAL]

Attest:

RUTH C. MASON
*Attesting Officer*

LUTRELLE F. PARKER
*Acting Commissioner of Patents and Trademarks*